United States Patent
Yardley et al.

(10) Patent No.: US 7,093,867 B2
(45) Date of Patent: Aug. 22, 2006

(54) LEAF COLLECTOR

(75) Inventors: Melvin W. Yardley, Aurora, UT (US); Kevin S. Yardley, Mount Pleasant, UT (US); Michael A. Yardley, 40 S. 400 East #78, Mount Pleasant, UT (US) 84647

(73) Assignee: Michael A. Yardley, Mount Pleasant, UT (US)

( * ) Notice: Subject to any disclaimer, the term of this patent is extended or adjusted under 35 U.S.C. 154(b) by 0 days.

(21) Appl. No.: 11/218,001

(22) Filed: Sep. 1, 2005

(65) Prior Publication Data

US 2006/0001280 A1  Jan. 5, 2006

Related U.S. Application Data

(63) Continuation-in-part of application No. 10/431,825, filed on May 8, 2003, now Pat. No. 6,953,213.

(60) Provisional application No. 60/378,723, filed on May 8, 2002.

(51) Int. Cl.
   *B65D 37/00*  (2006.01)
   *B65F 1/12*  (2006.01)
(52) U.S. Cl. .................... 294/1.1; 294/152
(58) Field of Classification Search .......... 294/1.1, 294/1.5, 137, 149, 152; 141/390, 391; 248/95, 248/99; 15/257.1
See application file for complete search history.

(56) References Cited

U.S. PATENT DOCUMENTS

| | | | |
|---|---|---|---|
| 443,397 A | 12/1890 | Mack | 229/115 |
| 2,254,578 A | 9/1941 | O'Brien | 190/107 |
| 2,433,945 A | 1/1948 | Foreman | 383/10 |
| 3,833,249 A | 9/1974 | McKinney, II | 294/1 |
| 4,209,116 A | 6/1980 | Hendricks | 224/49 |
| 4,269,348 A | 5/1981 | Young | 229/52 |
| 4,296,788 A | 10/1981 | Slater | 383/4 |
| 4,434,829 A | 3/1984 | Barnard | 150/49 |
| 4,519,183 A | 5/1985 | Parody | 53/461 |
| 4,628,007 A | 12/1986 | Ledsham | 428/542.8 |
| 4,793,532 A * | 12/1988 | Cash | 224/584 |
| 4,955,925 A | 9/1990 | Platti | 15/257.6 |
| 5,147,102 A | 9/1992 | Dyer, Jr. | 294/152 |
| 5,211,434 A | 5/1993 | Lanava | 294/1.1 |
| 5,417,462 A | 5/1995 | Hensley | 294/1.1 |
| D386,865 S | 11/1997 | Storm | D34/1 |
| 5,716,033 A | 2/1998 | Gibson | 248/95 |
| 5,878,461 A | 3/1999 | Killian | 15/257.1 |
| 5,879,039 A | 3/1999 | Baker et al. | 294/55 |
| 5,915,768 A | 6/1999 | Young | 294/1.1 |
| 6,202,718 B1 | 3/2001 | Innocenti | 141/391 |

* cited by examiner

*Primary Examiner*—Dean J. Kramer
(74) *Attorney, Agent, or Firm*—Kunzler & Associates (57) ABSTRACT

A device for collecting and gathering loose material such as grain, rocks, leaves, grass clippings, and the like. The device includes a substantially flat sheet with handles associated with opposite edges of the sheet. The sheet may be of various shapes. The device also includes one or more obstructing members that extend outward from a top surface of the sheet. The handles and the obstructing members are sized and shaped such that, when the sheet is rolled in a manner circumscribing the obstructing members, the obstructing members cooperate to obstruct or block one end of a container formed by the sheet and the handles are in close proximity to each other to enable a person to grasp the handles with a single hand. A user may gather material onto the sheet in a planar configuration and then roll the sheet to form a temporary container with the material kept inside by the sheet and the obstructing members. The rolled sheet and obstructing members cooperate to form a temporary container for transporting loose material.

12 Claims, 6 Drawing Sheets

LEAF COLLECTOR

RELATED APPLICATION

This application is a continuationinpart of and claims priority to U.S. patent application Ser. No. 10/431,825 entitled "LEAF COLLECTOR" and filed on May 8, 2003 now U.S. Pat. No. 6,953,213 for Melvin W. Yardley, Kevin S. Yardley, and Michael A Yardley, which is hereby incorporated by reference. Similarly, the earlier U.S. patent application Ser. No. 10/431,825 claimed benefit of U.S. Provisional Patent Application Ser. No. 60/378,723, filed May 8, 2002, for "Leaf Collector," with inventor Melvin W. Yardley, which is hereby incorporated by reference.

FIELD OF THE INVENTION

The present invention relates generally to the field of devices for collecting loose material. More specifically, the present invention relates to a leaf collector for gathering and disposing of leaves and other loose material.

DESCRIPTION OF RELATED BACKGROUND ART

Most people are familiar with the chore of gathering leaves or grass clippings from around the yard. Generally, the leaves, grass clippings, twigs, garbage, and other loose material (hereinafter "loose material") are collected into piles, which are then placed into garbage containers or disposable plastic bags. Getting the loose material from a pile and into a garbage container can be the most difficult step in the process.

Conventionally, a user repeatedly lifts part of the loose material, either by hand or using a combination of a hand and a rake or shovel, and places the loose material in the garbage container. This repeated movement is undesirable, as it may cause stress and strain on the user. Furthermore, this procedure may be messy and inconvenient if the loose material is wet. In addition, wind may scatter the loose material out of the pile such that the user must return to rebuilding the pile. While the task of moving the loose material from the pile to the garbage container is challenging, the task is easier with two or more workers. Nevertheless, a single user typically does the job.

Generally, the loose material, such as leaves and clippings, is gathered and collected for disposal. Those of skill in the art, however, will recognize that the same problems described above exist regardless of the nature of the loose material. For example, material such as grain, sand, small rocks, or the like may be gathered in bags or containers for purposes other than disposal. Numerous devices have been provided to facilitate moving a collection of loose material into a container for disposal or otherwise.

One solution provides a flat sheet. The loose material is gathered in a pile on the sheet. Then, the sheet is rolled or folded to form a cylinder or other generally prism shape having two open ends. The loose material is gathered within the prism shape. Next, the prism-shaped sheet is lifted and tipped to dump the loose material out one end of the cylinder.

Unfortunately, the prism-shaped sheet includes two open ends. The loose material tends to fall out one end or the other when the prism-shaped sheet is transported and/or dumped. Other devices, such as netting, may be formed into a temporary "bag" by gathering each corner together to enclose the loose material inside such that no loose material is lost. Such a "bag," however, proves difficult in practice to empty into a typical garbage container.

Another solution includes walls-configured to seal one open end when the sheet is formed into a prism shape. These devices, however, generally do not lie completely flat. The walls may impede gathering of the loose material onto the sheet. For example, a user may be required to rake or sweep loose material onto the sheet in a single direction, much like a dustpan. Other devices lie substantially flat, but with such devices, the loose material often gets blown or raked across the sheet instead of collecting into a pile as is generally desired.

While some of the problems with conventional devices may be resolved by using two workers, none of the conventional devices provides an effective, simple, lightweight, inexpensive tool to assist someone performing the chore alone. Accordingly, what is needed is a device that overcomes the problems and disadvantages of the prior art. In particular, the device should lie flat for collection of loose material onto the device and include an obstructing member that assists in preventing the loose material from being raked across the device. The device should be transformable into a cylinder or other temporary prism-shaped container that retains the loose material inside and closes one end of the container for effective transport of the loose material to a desired location. The device should be capable of being locked in the temporary container configuration. Furthermore, the device should be lightweight, sturdy, durable, simple, and inexpensive. The present invention provides these advancements in a novel and useful way.

SUMMARY OF THE INVENTION

The various elements of the present invention have been developed in response to the present state of the art, and in particular, in response to the problems and needs in the art that have not yet been fully solved by currently available devices. Accordingly, the present invention provides an improved device for collecting and gathering loose material.

In one embodiment, the device includes a pliable, substantially planar sheet. The sheet is substantially thin and made from a resilient, elastic material such as plastic or metal. Preferably, the sheet is formed to maintain a planar configuration. The planar configuration is a first position wherein the planar sheet lies substantially flat. If the sheet is rolled or bent, the sheet is biased to return to the planar configuration.

The device includes one or more obstructing members that extend out from the surface of the sheet. The obstructing members may be positioned near one edge of the sheet. The planar sheet is easily transitionable between the first position wherein the planar sheet lies substantially flat to a second position wherein the planar sheet forms a container.

The obstructing members cooperate to partially obstruct an opening of the container formed when the sheet is rolled such that the sheet substantially circumscribes the obstructing member. The obstructing members may be configured to partially or completely obstruct the opening. The obstructing members may be of almost any shape.

The obstructing members may be connected to an edge of the sheet, formed from the same material as the sheet, or removably connected to the sheet. Preferably, the obstructing members are substantially aligned along one edge of the sheet such as the back edge. The obstructing members may extend vertically from a surface of the sheet. Alternatively, the obstructing members may extend from the surface at about any angle.

In one embodiment, the obstructing members are configured and positioned such that as the sheet is rolled to bring one side in close proximity to an opposite side, the obstructing members are juxtaposed to substantially close an opening defined by the rolled sheet. For example, the obstructing members may be triangular shaped with a height about equal to the radius of a circular opening defined by the rolled sheet. The exposed sides of each triangular obstructing member may abut a neighboring obstructing member to close the opening. Alternatively, the tips of triangular obstructing members may be removed (forming blunted triangular shapes) such that when the sheet is rolled, the obstructing members leave a polygon-shaped opening which is much smaller than an opening defined by the sheet alone.

In another aspect, the obstructing members include a tongue on one exposed side and a groove on another exposed side. The tongue and groove are configured such that as the sheet is rolled, the tongue of one obstructing member engages the groove of a neighboring obstructing member to effectively seal the opening of the rolled sheet. Alternatively, the obstructing members may be positioned in an overlapping fashion such that when the sheet is rolled, one obstructing member overlaps about half the surface area of a neighboring obstructing member to seal the opening.

In certain embodiments, a single obstructing member may be configured to operably obstruct the opening. For example, a circular obstructing member may be connected to the sheet near a back edge. The circular obstructing member may operably prevent passage of loose material through a circular opening defined by the back edge when the sheet is rolled to circumscribe the circular obstructing member. In certain embodiments, an obstructing member may engage a groove formed in the sheet to form an effective seal that prevents passage of loose material within the rolled sheet through the opening.

For convenience, the device may include one or more handles connected to or formed within the sheet. The handles may be positioned along a side adjacent to a side of the sheet that includes the obstructing members. In addition, one or more fasteners may be connected to, or formed within, sides adjacent to the side of the sheet which includes the obstructing members. The fasteners allow a user to hold two sides of the sheet in close proximity when the sheet is in a rolled configuration.

In one embodiment, each side may include a hook that engages a corresponding handle formed in the opposite side. Alternatively, each side may include a corresponding member of a fastener assembly. For example, one side may include a hook material strap, and the opposite side may include a loop material strip such as corresponding components of a VELCRO™ assembly. Alternatively, corresponding members of snaps, hooks, buckles, clip retainers, tie straps, and the like may serve as fasteners. One example of a buckle includes a life-preserver buckle. In certain aspects, the sheet includes an array of holes sized to allow air to escape from inside a rolled sheet but prevent escape of the loose material.

Preferably, the components of the device are made from durable, lightweight materials such as metal, plastic, or the like. In one embodiment, the sheet is a thin piece of pliable rigid plastic. The fasteners, handles, and obstructing members may be made of various materials.

The components may be of various shapes while still serving their function. For example, the sheet may be polygonal, circular, oval, or the like. Preferably, the sheet is rectangular or square. Similarly, the obstructing members may be polygonal, circular, oval, or the like. In one embodiment, the obstructing members are triangular shaped.

The components of the device may be sized to allow a single user to easily handle the device. Of course, the device may also be sized to gather a larger volume of loose material and/or be used by a pair of users. The size and shape of the sheet determine the size and shape of the rolled sheet when in a temporary prism-shaped container configuration. Preferably, the sheet is about forty-eight inches square, and the obstructing members are equilateral triangles with a width of about three inches wide and a height of about seven inches.

Thus, a durable, lightweight, collapsible device for collection of loose material for tasks such as yard work is provided. The device may be easily assembled, and in certain embodiments, no assembly is required. In addition, a single person can easily lay the sheet on the ground, gather the loose material onto the surface of the sheet, roll the sheet such that the obstructing members partially obstruct one end of the rolled sheet, and transport the loose material within the sheet to a container. Using the device, a single person may easily collect, transport, and dump loose material without assistance and with minimal stress from repeated bending and lifting. These and other features and advantages of the present invention will become more fully apparent from the following description and appended claims, or may be learned by the practice of the invention as set forth hereinafter.

BRIEF DESCRIPTION OF THE DRAWINGS

Non-exhaustive embodiments of the invention are described with reference to the figures, in which.

DETAILED DESCRIPTION OF PREFERRED EMBODIMENTS

The present invention solves the foregoing problems and disadvantages with a sturdy planar sheet having obstructing members for retaining loose material within the sheet when the sheet is in a temporary prism-shaped container configuration.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
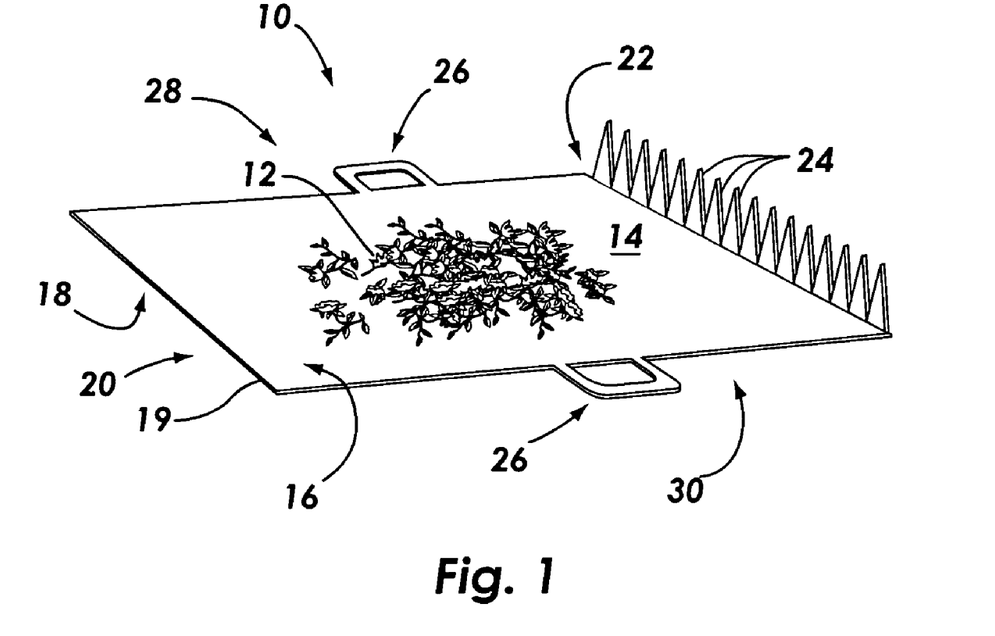
FIG. 1 is a perspective view of one embodiment of a leaf collector device of the present invention in a substantially flat position.

Referring now to FIG. 1, in one embodiment, there is shown a device 10 for collecting loose material 12. The device 10 assists in gathering the loose material 12 into a pile. In addition, the device 10 is deformable into a temporary container. As a temporary container, the device 10 allows the loose material 12 to be transported and dumped, for example, in a garbage container. Preferably, the device 10 is made to be stored and used initially in a planar configuration, as illustrated.

The device 10 includes a planar sheet 14 that forms the body of the device 10. In the illustrated embodiment, the sheet 14 includes a top surface 16 and a bottom surface 18. In the planar configuration of FIG. 1, the sheet 14 serves as a base for collecting the loose material 12 into a pile on the top surface 16.

The sheet 14 also includes a front edge 20 opposite a back edge 22. Preferably, the sheet 14 is a thin piece of material, and the front edge 20 and back edge 22 are straight. Alternatively, the front edge 20 and back edge 22 may be contoured.

The device 10 also includes one or more obstructing members 24 that extend out from the top surface 16 of the sheet 14. Preferably, the sheet 14 includes a plurality of obstructing members 24. Alternatively, the sheet 14 may include a single obstructing member 24.

With the sheet 14 in a planar configuration, the obstructing members 24 are sized and positioned to minimally impede a user's efforts to collect the loose material 12 onto the top surface 16. In the illustrated embodiment, a user may rake or sweep loose material 12 onto the sheet across three sides. In addition, the user may rake loose material 12 over the obstructing members 24.

Preferably, the obstructing members 24 extend substantially at a right angle from the top surface 16. Alternatively, the obstructing members 24 may extend at almost any angle from the top surface 16. The obstructing members 24 may be located along or near the back edge 22. Alternatively, the obstructing members 24 may be positioned along any edge of the sheet 14. The obstructing members 24 may be formed from the same material as the sheet 14. For example, the obstructing members 24 may be integrated with the back edge 22. Alternatively, the obstructing members 24 may comprise a separate component that is connected to the sheet 14. In one embodiment, the obstructing members 24 are removably connected to the sheet 14.

The shape and structure of the obstructing members 24 may vary. In one example, the obstructing members 24 described herein are configured as tabs that extend from the top surface 16. Of course, the one or more obstructing members 24 may also be characterized as fingers, strips, a wall, a stop, or the like and still serve the intended purpose of obstructing members 24 in the present invention. In the illustrated embodiment, the obstructing members 24 are triangular shaped. Specifically, the obstructing members 24 may be triangular shaped. In one embodiment, the obstructing members 24 are formed as isosceles triangles in which two sides of equal length are not connected to the sheet 14, while the other side which may be of a different length is attached.

In the illustrated embodiment, the device 10 includes one or more handles 26. The handles 26 facilitate rolling the sheet 14 from an open planar configuration into a temporary container configuration, discussed in detail below. The handles 26 also assist in manually closing the device 10 and manually maintaining the device 10 in a closed position. In addition, the handles 26 provide convenience in lifting, transporting, and dumping or emptying the sheet 14 in a rolled configuration. Preferably, the handles 26 are formed integral to the sheet and extend from a side in the same plane as the sheet 14. The handles 26 may be positioned along and parallel to one or both sides 28 of the sheet adjacent to the back edge 22. Alternatively, the handles 26 may be positioned on opposite sides 28, 30, and parallel to sides 28 and 30. (also referred to herein as side edges 28, 30) of the sheet 14.

Figure 2:
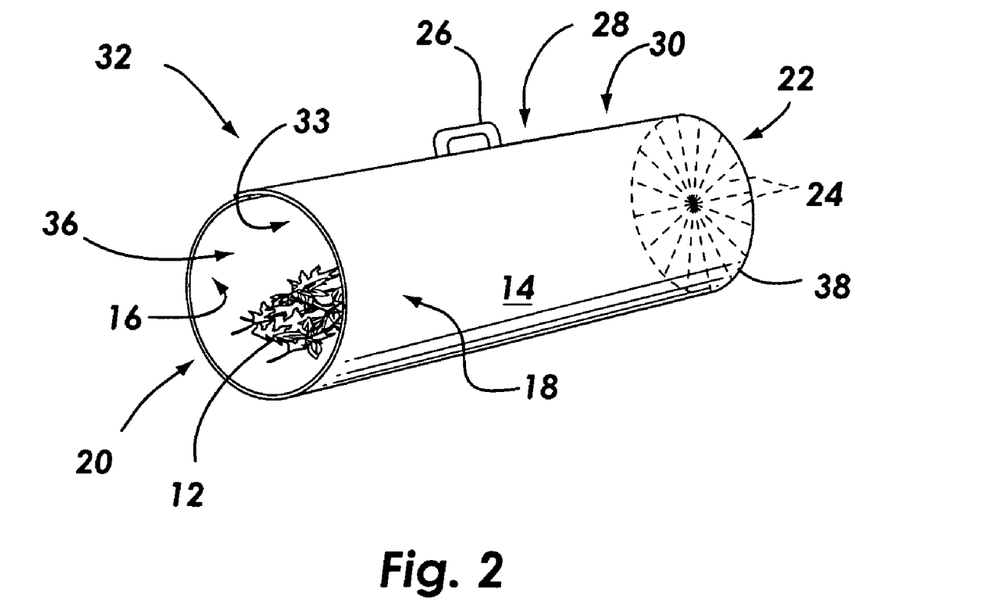
FIG. 2 is a perspective view of one embodiment of a leaf collector device arranged in a temporary prism-shaped container configuration.

In FIGS. 1 and 2 the handles 26 are shown aligned with each other to enable a user of the device 10 to grasp both handles 26 simultaneously with a single hand. The handles 26 may also be offset from each other. Configuring handles 26 parallel to opposite sides 28 and 30 allows a user of the device 10 to grasp both handles in opposite hands to close the device 10. Positioning the handles 26 to line up with each other in the closed position when the device 10 is in a container configuration allows a user of the device to use a single hand to maintain the device 10 in a closed position and to pick up the loaded device 10 with a single hand, depending on the weight of the enclosed load.

In one embodiment, the handles 26 are made by forming parallel handle holes in the opposite sides 28 and 30 to reduce manufacturing costs. However, including extended handles 26 as shown in FIGS. 1 and 2 allows the user of the device 10 to more easily grasp the handles 26. In actual use, it may be desirable that the handles 26 do not quite line up with each other, allowing a user to place a thumb through a hole in one handle 16 and four fingers through a hole in a second handle 26.

The handles may be formed to create elongated holes for grasping. In one embodiment, shown in FIG. 2, the handles 26 are positioned close to the middle of opposite edges 28 and 30 to balance the device and the load carried inside the device. In another embodiment, the handles 26 are positioned between the middle of opposite edges 28 and 30 and the front opening 36 to cause the device to be unbalanced. This unbalanced configuration causes the loose material 12 to shift toward the back edge 22, preventing spilling of the loose material 12.

Referring now to FIG. 2 and generally to FIG. 1, preferably, the sheet 14 is configured to maintain a first position in which the sheet lies substantially flat (See FIG. 1). This first position is the planar configuration. When necessary, the sheet 14 may be readily transitioned to a second position to form a container 32 (See FIG. 2). Preferably, in forming the container 32, the planar sheet substantially circumscribes the obstructing member(s) 24 to at least partially obstruct one end of the container 32.

The present invention also provides a method of using the device 10. In one embodiment, the device 10 is originally in a planar configuration as in FIG. 1. A user lays the device 10 on a surface, such as a lawn, with the top surface 16 facing up. Next, the user gathers loose material 12 into a pile on top of the sheet 14. The loose material 12 may be gathered by raking, sweeping, or the like.

Referring still to FIG. 2, once a pile is made, the user rolls one side 28 towards the other side 30 such that the edges of the sides 28, 30 come in close proximity. A temporary fastener 34 may hold the sides 28, 30 together. For example, the fastener 34 may be a hook that engages a corresponding handle 26.

By rolling the sides 28, 30, the user transforms the device 10 from a planar configuration into a temporary container 32 having an interior 33. FIG. 2 illustrates the device 10 in the form of a temporary container 32. The sheet 14 becomes a wall that defines the interior 33 that is located within the container 32 and configured to hold the loose material 12. The container 32 has a prism shape corresponding to the geometric shape of the sheet 14. In the depicted embodiment, the sheet 14 is rectangular shaped. Consequently, the container 32 is cylindrical. Similarly, other shapes of the sheet 14 will result in prism containers 32 having other shapes.

The temporary container 32 includes a front opening 36 defined by the front edge 20 and a back opening 38 defined by the back edge 22. Preferably, the front opening 36 remains unobstructed. The front opening 36 may be used to insert residual loose material 12.

The back opening 38 is at least partially obstructed by the obstructing members 24. In the illustrated embodiment, the user rolls the sheet 14 to bring the sides 28, 30 together, which causes the sheet 14 to circumscribe the obstructing members 24. As the sheet 14 circumscribes the obstructing members 24, the obstructing members 24 move in relation to each other to close openings between neighboring obstructing members 24. By closing these openings, the obstructing members 24 restrict, or at least partially obstruct, the back opening 38 to prevent escape of the loose material 12 from within the container 32. Alternatively, another set of obstructing members 24 may close the front opening 36 as well.

As used herein, the terms "circumscribing" or "circumscribe" are intended to mean, "to substantially surround or form a boundary around." These terms mean that the sheet 14 is reconfigured to surround the obstructing members 24 in two-dimensions and not necessarily in three-dimensions. Those of skill in the art will readily recognize that the sheet 14 forms a perimeter around the obstructing members 24 and may or may not completely enclose all portions of one or more obstructing members 24.

The obstructing members 24 at least substantially block the back opening 38 so that a user may lift the container 32 by the handles 26 while the loose material 12 is kept inside the container 32. The user may lift and carry the container 32 with the front edge 20 elevated above the back edge 22. The loose material 12 may shift towards the back opening 38, but the obstructing members 24 prevent the loose material 12 from exiting. Preferably, the user carries the container 32 to another location such as a garbage container, storage bin, or the like. Finally, the user dumps the loose material 12 into a garbage container using the front opening 36. The user may then unfasten the temporary fasteners 34, return the device 10 to a planar configuration, and place the device 10 on the ground to repeat the process.

The degree to which the back opening 38 is obstructed depends on several factors relating to the shape, size, configuration, and other features of the sheet 14 and obstructing members 24. Preferably, each obstructing member 24 is a solid piece of material sized and shaped to effectively close the back opening 38 when the sheet 14 circumscribes the obstructing members 24.

The obstructing members 24 may partially or completely obstruct the back opening 38. In one embodiment, the obstructing members 24 are configured to be juxtaposed as the sheet 14 is rolled. The obstructing members 24 abut each other in this embodiment. In other embodiments, described below, the obstructing members 24 engage each other to form a more effective obstruction of the back opening 38.

Preferably, the obstructing members 24 extend perpendicular to the top surface 16. In the container 32 configuration, the obstructing members 24 extend within a common plane to substantially obstruct the back opening 38. Alternatively, the obstructing members 24 may project into the exterior or interior of the container 32, depending on the angle of the obstructing members 24 with respect to the top surface 16. Those of skill in the art will recognize that the shape and size of the obstructing members 24 depend in part on the desired configuration of the obstructing members 24 when the sheet is rolled into a prism configuration as illustrated.

To provide a sturdy, lightweight device 10, the present invention may be made of materials that are strong, lightweight, and durable. The components may be made from a variety of materials that allow the components to perform their proper function. For example, the sheet 14 is a pliable material that tends to return to the planar configuration when the sides 28, 30 are not temporarily fastened. The obstructing members 24 are semi-rigid to prevent the loose material 12 from bending the obstructing member 24 and escaping from within the rolled sheet 14. Examples of material that may be used include metal, wood, plastic, and other natural or man-made materials.

Figure 3:
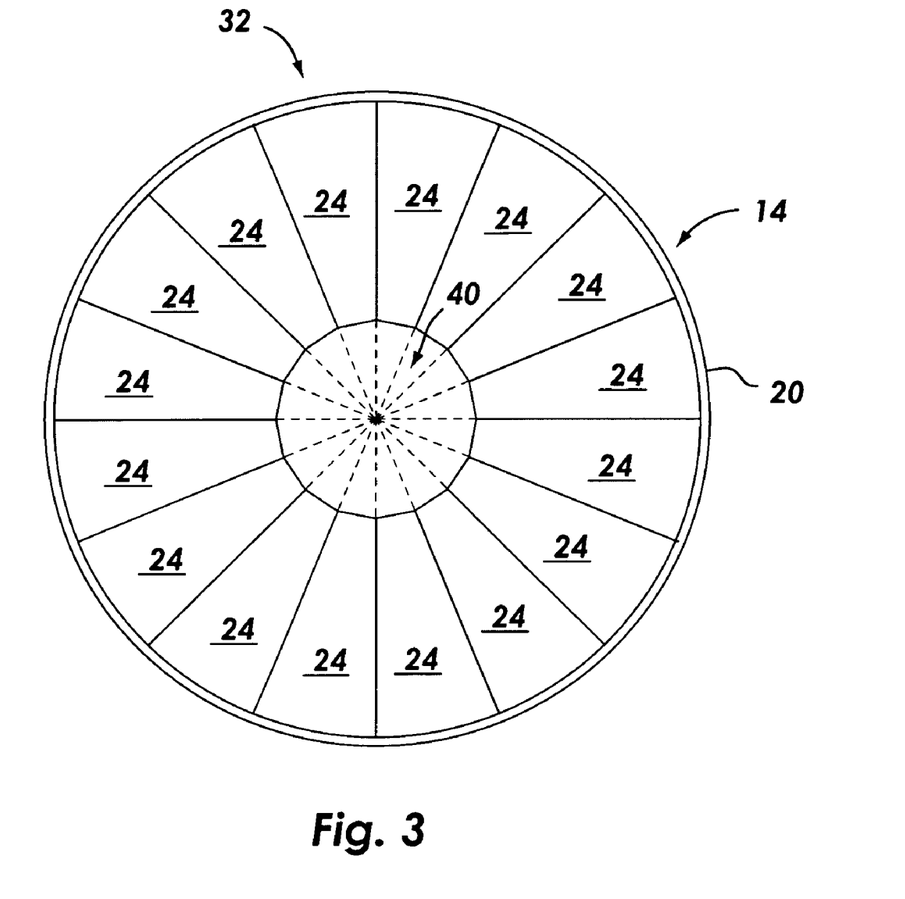
FIG. 3 is a plan view illustrating an obstructed end of one embodiment of the device.

Referring now to FIG. 3, a plan view of the device in a container configuration is illustrated. In this embodiment, the height of the obstructing members 24 (including the dashed line portions) corresponds to the radius of the back opening 38 (See FIG. 1). In addition, the number and width of obstructing members 24 evenly divides the circumference of the back opening 38. Of course, the obstructing members 24 may be of unequal widths and/or heights.

As illustrated, when the sheet 14 is rolled to form the container 32, each obstructing member 24 blocks or obstructs a sector of the back opening 38. Each obstructing member 24 is juxtaposed against a neighboring obstructing member 24. Together, the obstructing members 24 cooperate to substantially block the back opening 38.

FIG. 3 also illustrates an alternative embodiment for the obstructing members 24. The tops of the obstructing members 24 may be removed to form blunted triangular shapes (forming a perimeter around the dashed lines). The obstructing members 24 may be blunted for aesthetic and/or safety reasons. For example, with pointed obstructing members 24, the device 10 may present a potential hazard when in the planar configuration.

FIG. 3 illustrates that with blunted triangular obstructing members 24, when the sheet 14 is configured as a temporary container 32, the back opening 38 is not completely blocked. The blunted triangular obstructing members 24 leave a polygon-shaped opening 40. Depending on the intended use for the device 10, the polygon opening 40 may continue to prevent escape of the loose material 12. For example, if the loose material 12 comprises leaves, the polygon opening 40 may be small enough to prevent passage of leaves from within the container 32.

Figure 4:
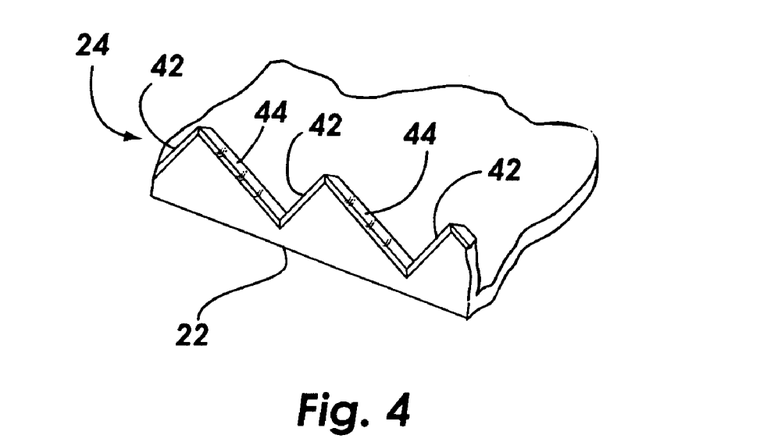
FIG. 4 is a perspective view of a pair of neighboring obstructing members.

FIG. 4 illustrates a close-up view of an alternative embodiment of a pair of neighboring triangular-shaped obstructing members 24. One side of each triangular-shaped obstructing member 24 is connected to the back edge 22. One unconnected side includes a tongue 42, and the other unconnected side includes a groove 44. The tongue 42 of one obstructing member 24 is configured to engage a groove 44 of a neighboring obstructing member 24.

In certain embodiments, the tongue 42 may comprise an unaltered edge of the obstructing member 24. Alternatively, the edge may be beveled or otherwise configured to provide a tongue 42. The groove 44 is preferably a channel formed along the length of one side of the obstructing member 24. Those of skill in the art will readily recognize that various alternative tongue and groove assemblies may be used with the obstructing members 24 of the present invention. When the sheet 14 is rolled into the container configuration, as described above, the tongue 42 of one obstructing member 24 moves toward the groove 44 of a neighboring obstructing member 24, and vice versa. The tongue 42 then engages the groove 44 to form an effective interface between the two obstructing members 24.

FIG. 4 also illustrates the obstructing members 24 as solid pieces of material. Alternatively, the obstructing members 24 may include holes or perforations (not shown). If holes or perforations are included, these are preferably sized to be smaller than the primary loose material 12 the device 10 is designed to gather and collect.

Figure 5A:
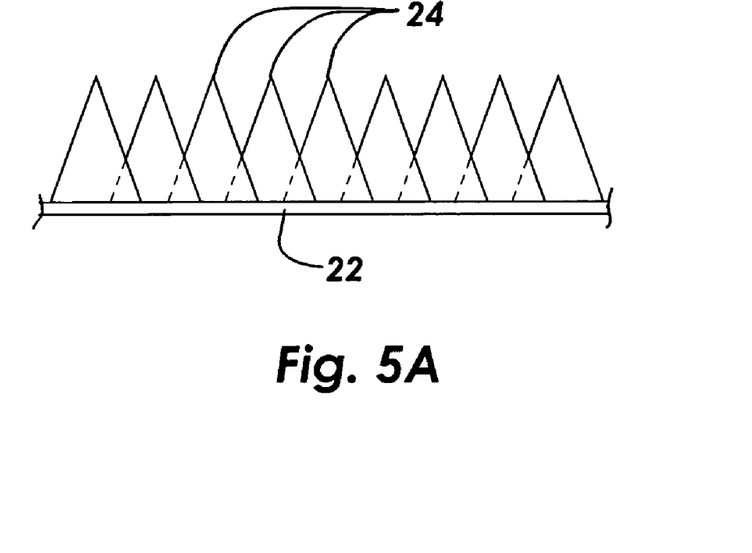
FIG. 5A is an end view of another embodiment of obstructing members.

FIG. 5A illustrates yet another embodiment of the obstructing members 24. In this embodiment, the obstructing members 24 are arranged on the sheet 14 such that a portion of one obstructing member 24 overlaps a neighboring obstructing member 24 when viewed from the back edge 22. Preferably, the obstructing members 24 overlap each other laterally on one side by about 50%. Those of skill in the art will recognize, however, that a variety of overlapping configurations are possible within the scope of the present invention. For example, both bottom corners of alternating obstructing members 24 may overlap (not shown).

Figure 5B:
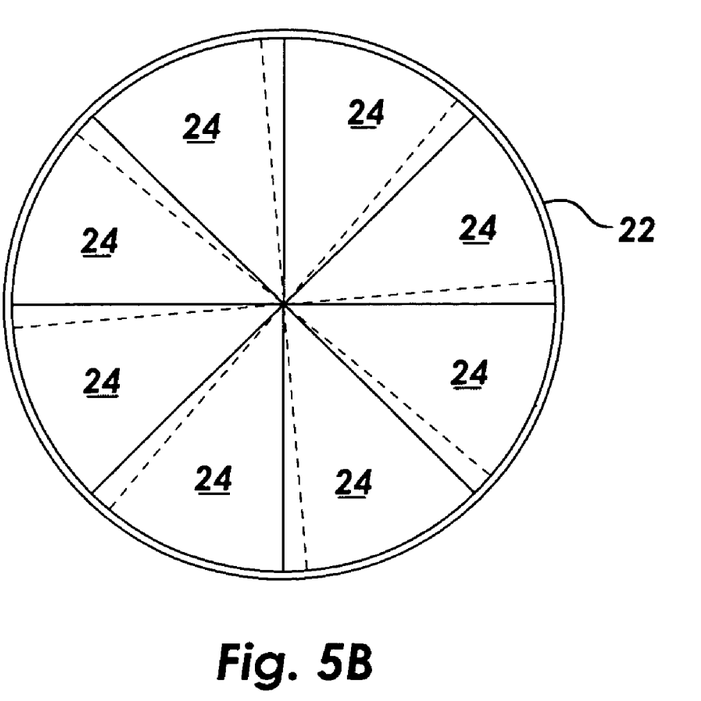
FIG. 5B is a plan view of the obstructing members of FIG. 5A arranged to enclose an opening.

FIG. 5B illustrates obstructing members 24 according to the embodiment of FIG. 5A in a plan view when the sheet 14 is rolled into the temporary container 32 configuration. FIG. 5B illustrates that rolling the sheet 14 causes the overlapping obstructing members 24 to become juxtaposed and intermeshed. In alternative embodiments, the overlapping pattern may be varied to provide a uniform intermeshing of the obstructing members 24 when the sheet 14 is rolled.

Figure 6:
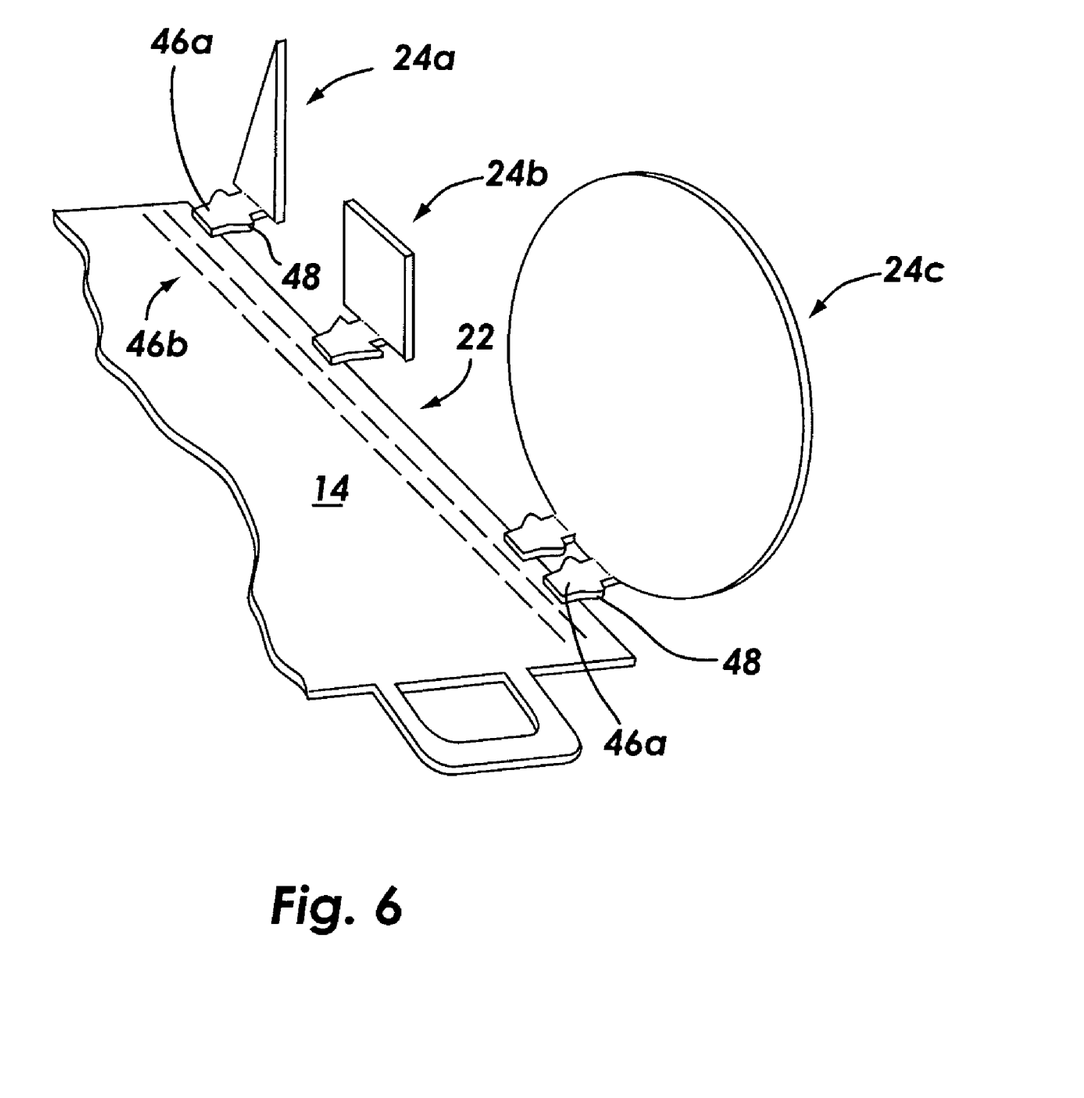
FIG. 6 is a perspective view of an alternative embodiment including removable obstructing members.

FIG. 6 illustrates an alternative embodiment of the device 10 in which the obstructing members 24 are removably connected to the sheet 14 by a fastener assembly. The fastener assembly may comprise corresponding components that temporarily engage each other. Examples of fastener assemblies include hook and loop assemblies, button assemblies, snap assemblies, tape, temporary glue, and the like. Additionally, those of skill in the art recognize a number of different fastener assemblies that may be used to temporarily secure obstructing members 24 to the sheet 14.

In FIG. 6, the temporary fastener assembly comprises one or more tabs 46*a* and one or more corresponding slots 46*b*. The tabs 46*a* are configured to readily pass within the slots 46*b*. The tabs 46*a* include a barb 48. The barb 48 slides through a slot 46*b* and prevents unintentional removal of the tab 46*a*.

The sheet 14 may include a plurality of slots 46*b* disposed near the back edge 22. A user may attach a variety of different sized or shaped obstructing members 24 to the sheet 14 using the slots 46*b*. In addition, the configuration of the attached obstructing members 24 may be changed as needed.

FIG. 6 illustrates a few examples of alternative embodiments for the removably connected obstructing members 24. Of course, the obstructing members 24 of these examples may also be permanently connected to the sheet 14 in other embodiments. A triangular obstructing member 24*a* is discussed above. A square obstructing member 24*b* may be used. Alternatively, a single circular obstructing member 24*c* may be removably connected to the sheet 14.

Preferably, the removably connected obstructing members 24*a*–*c* are connected prior to a user rolling the sheet 14 to form a temporary container 32. Alternatively, the removably connected obstructing members 24*a*–*c* may be connected at any stage. Removably connected obstructing members 24*a*–*c* allow for flexibility in the configuration of the obstructing members 24, as well as simple replacement and repair for obstructing members 24 of the device 10 as needed.

As mentioned above, one or more obstructing members 24 may be used in different embodiments. Preferably, if a single obstructing member 24 is used, the obstructing member 24 is sized and shaped to substantially obstruct the back opening 38 defined by the back edge 22. Similarly, if a plurality of obstructing members 24 are used, the obstructing members 24 are configured to operably obstruct the back opening 38. Those of skill in the art will recognize from this description of the present invention that a variety of alternative configurations and embodiments exist beyond the examples described here. These other embodiments are also considered to be within the scope of the present invention.

Figure 7A:
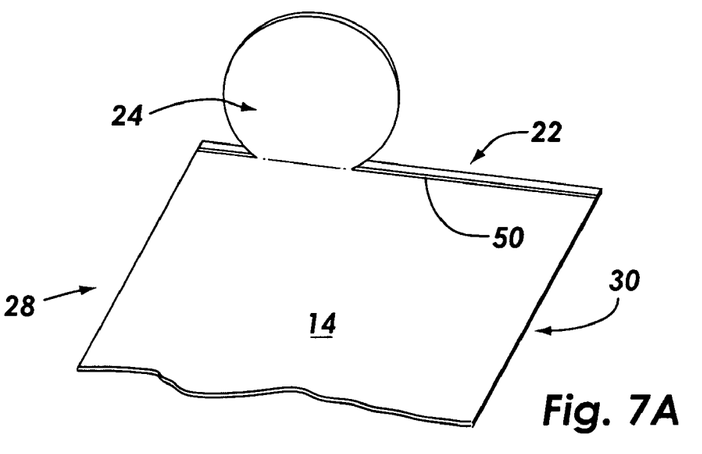
FIG. 7A is a perspective view of an alternative embodiment including a single obstructing member.
Figure 7B:
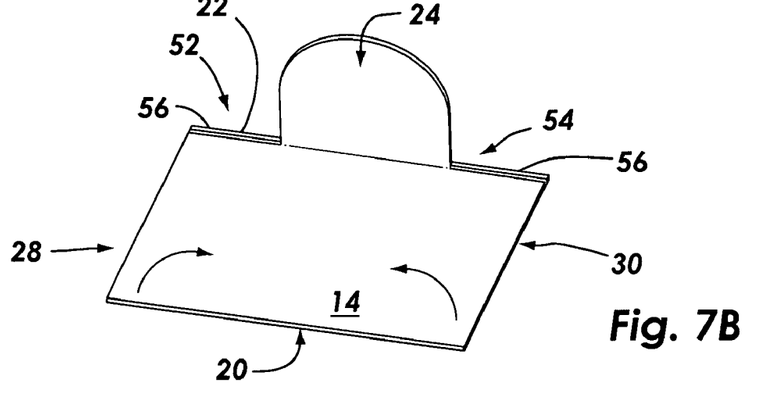
FIG. 7B is a perspective view of an alternative embodiment including a single obstructing member.
Figure 7C:
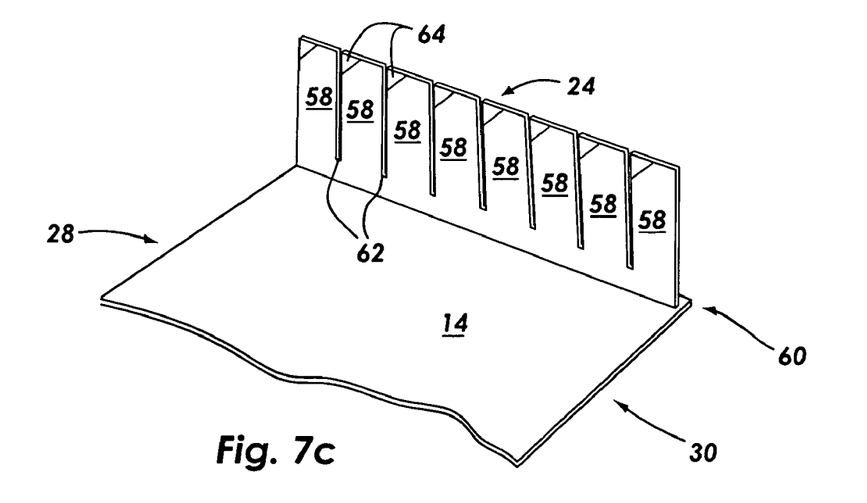
FIG. 7C is a perspective view of an alternative embodiment including obstructing members.

FIGS. 7A–7C illustrate examples of alternative embodiments of the present invention. These alternative embodiments include a single obstructing member 24. Handles 26 and other features are omitted for clarity.

Referring to FIG. 7A, the sheet 14 is rectangular shaped so the back opening 38 (See FIG. 2) is a circle when the sheet is rolled. Accordingly, a circular obstructing member 24 is connected to the back edge 22. The obstructing member 24 is offset to one side 28, 30 along the back edge 22. Alternatively, the obstructing member 24 may be positioned at any point along the back edge 22.

In addition, the sheet 14 includes a groove 50 that is aligned with the obstructing member 24. The groove 50 serves to engage the free edge of the obstructing member 24 when the sheet 14 is rolled such that the sheet substantially circumscribes the obstructing member 24 to form a temporary container 32. The groove 50 supports the obstructing member 24 in blocking passage of loose material 12.

FIG. 7B illustrates an embodiment in which the sheet 14 has six non-uniform length sides. Of course, while straight sides are described herein, the sides of the sheet 14 may also be curved in other embodiments. The sheet 14 includes two opposing sides 28, 30 and two sides 52, 54 that are adjacent to the side 22 comprising the obstructing member 24. Preferably, the obstructing member 24 is on a side 22 of the sheet 14 perpendicular to the sides 28, 30 that come together to form a temporary container 32.

In FIG. 7B, the obstructing member 24 is sized and shaped to abut side 52 and side 54 when side 28 is rolled to meet side 30, as indicated by the arrows. In this embodiment, the obstructing member 24 is a half-oval shape. In certain embodiments, side 52 and side 54 may include a lip 56. The free edge of the obstructing member 24 may rest upon the lip 56 or abut the lip 56 when the sheet 14 is configured as a temporary container 32. The lip 56 thus may be employed to support the obstructing member 24 and/or to more fully seal the opening 22.

Referring now to FIG. 7C, an alternative obstructing member 24 is illustrated. The obstructing member 24 comprises a wall of square or rectangular segments 58. A bottom edge 60 interconnects each segment 58 and connects the segments 58 to the sheet 14. A thin space 62 between each segment 58 allows one segment to slide past a neighboring segment 58 when the sides 28, 30 are rolled such that the sheet 14 substantially circumscribes the obstructing member 24. To further facilitate sliding the segments 58 past each other, each segment 58 may include an angled corner 64.

Figure 8:
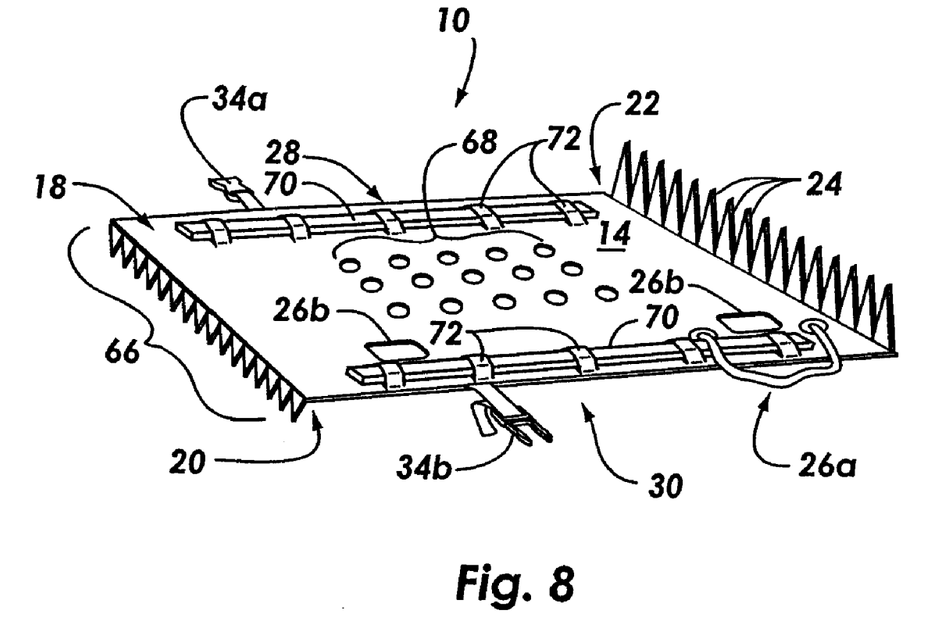
FIG. 8 is a perspective view of an alternative embodiment including various alternative features.

FIG. 8 illustrates yet another embodiment of the present invention. In FIG. 8, various alternative handles 26 and temporary fasteners 34 are illustrated for exemplary purposes. As described above in relation to FIGS. 1–2, the device 10 includes a sheet 14 with one or more obstructing members 24 disposed along a back edge 22. In certain embodiments, one or more anchor members 66 extend down from the bottom surface 18. The anchor members 66 are positioned near the front edge 20.

The anchor members 66 serve to hold the sheet 14 in a stationary position as loose material 12 is gathered on the top surface 16. The anchor members 66 may also be removably connected to the sheet 14. In FIG. 8, the anchor members 66 are of a similar shape, configuration, and arrangement as the obstructing members 24, but extend from the opposite surface. Those of skill in the art recognize that the anchor members 66 may comprise one or more projections from the bottom surface 18 that provide the same anchoring function. All such embodiments are considered within the scope of the present invention.

In some embodiments, the device 10 includes an array of holes 68 disposed in the sheet 14. Preferably, the holes 68 are sized to be smaller than the loose material 12. The holes 68 serve to allow air to escape from within the sheet 14 when the sheet 14 is rolled such that the sheet 14 substantially circumscribes the obstructing members 24. In certain embodiments, a user may need to compress the rolled sheet to engage temporary fasteners 34. The holes 68 facilitate compressing the loose material 12.

It is contemplated that a variety of temporary fasteners 34 may be used to temporarily fasten side edge 28 to side edge 30. For example, the temporary fasteners 34 may comprise one member 34a that slides within the other member 34b and snaps in similar manner to a life-preserver buckle. In another embodiment, Velcro® straps or other kinds of ties may be used. Alternatively, each side edge 28, 30 may include "J" or "S" hooks connected to the side edge 28, 30. The "J" or "S" hooks may be interlocked to fasten the side edges 28, 30. Of course, those of skill in the art will readily recognize that a variety of other temporary fasteners 34 may be used to allow a user to fasten and unfasten the sides 28, 30, preferably without tools. These variations on temporary fasteners 34 are also considered to be within the scope of the present invention.

In addition, FIG. 8 illustrates various embodiments for the handles 26. FIG. 1 illustrates handles 26 formed from the sheet and extending from a side in the same plane as the sheet 14. Alternatively, the handles 26 may be connected to the sheet 14 or formed within the perimeter of the sheet 14.

For example, a handle 26a may comprise a piece of rope passed through two holes in the sheet 14. Alternatively, the handle 26b may comprise a hole 26b disposed in the sheet 14 near a side edge 28, 30. The hole 26b is sized to readily receive a user's hand. The user grips the sheet material as a handle.

Referring still to FIG. 8, in certain embodiments, the device 10 includes a pair of ribs 70 connected to the sheet 14 in close proximity to the side edges 28, 30. The ribs 70 provide sufficient weight to retain the side edges 28, 30 against the ground when the is device is used in a flat configuration for collecting debris. As the side edges 28, 30 are rolled repeatedly together, the planar sheet 14 may begin to bow up near the sides 28, 30. Accordingly, the weight of the ribs 70 counteract this tendency such that the sheet 14 lies substantially flat when unrolled.

In the depicted embodiment, the ribs 70 are removable and are connected to the sheet by threading the ribs 70 through corresponding loops 72 formed in the sheet 14. Preferably, the ribs 70 are rectangular metal rods that thread alternately through the loops 72. Alternatively, the ribs 70 may be round rods. In yet another embodiment, the ribs 70 may comprise an integral part of the sheet 14. For example, the ribs 70 may comprise tubular members (not shown) that extend along the length of the side edges 28, 30. The tubular members may contain a metal or wooden rod. Alternatively, the tubular members are filled with a high mass material such as lead, sand, or the like.

Referring now to FIGS. 1–2 collectively, the present invention also provides a method of collecting loose material 12. First, the device 10 is positioned over a desired location. The device 10 is in a planar configuration and placed with the top surface 16 facing up. Next, the user gathers loose material 12 onto the top surface 16. Once sufficient loose material 12 is gathered, the user rolls the sheet 14 such that one side edge 28 is brought in close proximity to the other side edge 30. The sheet 14 substantially circumscribes the obstructing members 24. The obstructing members 24 cooperate to obstruct an opening 38 formed by rolling the sheet 14. Now, the sheet 14 is in the form of a temporary container 32.

In one embodiment, the user may temporarily fasten one side edge 28 to the other side edge 30 by way of temporary fasteners 34. Furthermore, the user may lift the rolled sheet 14 with the front edge 20 elevated such that the loose material 12 moves towards the obstructed back edge 22. As desired, the user may transport the loose material 12 by carrying the container 32. Finally, the user may empty the loose material 12 from the rolled sheet 14 by orienting the front opening 36 downward. For example, the user may empty the loose material 12 into a garbage container.

Based on the foregoing, the present invention offers a number of advantages not available in conventional approaches. The present invention lies substantially flat for collection of loose material onto the device. In addition, the present invention transforms into a temporary container that retains the loose material inside. The device may be temporarily fastened in the temporary container configuration. Obstructing members operably obstruct or block one end of the temporary container such that the loose material may be transported to a desired location without escaping. Furthermore, the present invention allows a sole user to easily perform the task of gathering, hauling, and dumping the loose material. The present invention may be used without tools and stored in a relatively flat, thin space. Finally, the present invention is lightweight, sturdy, durable, simple, and inexpensive to fabricate.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A device for collecting loose material, the device comprising:
   a pliable planar sheet having a top surface, two side edges on opposite sides of the sheet, and a back edge adjacent to the two side edges, each side edge having an associated handle positioned parallel to the associated side edge;
   a plurality of obstructing members extending from the top surface of the sheet at a permanent angle relative to the top surface of the sheet; and
   wherein the obstructing members are configured to restrict an opening formed on one end of a container when the sheet is rolled around the obstructing members such that the sheet substantially circumscribes the obstructing members and the side edges substantially meet each other such that the handles are in close proximity to each other, allowing a person to maintain the side edges close to each other by grasping both of the handles with a single hand.

2. The device of claim 1, wherein the obstructing members are positioned near the back edge.

3. The device of claim 1, wherein the obstructing members extend substantially perpendicular to the top surface.

4. The device of claim 1, wherein the obstructing members are removably connected to the sheet.

5. The device of claim 1, wherein the obstructing members are configured such that when the sheet is rolled the sheet substantially circumscribes the obstructing members, the back edge defines the opening and the obstructing members are juxtaposed to substantially block the opening.

6. The device of claim 5, wherein the juxtaposed obstructing members intermesh.

7. The device of claim 1, wherein each obstructing member comprises a tongue and a groove.

8. The device of claim 1, wherein the handles comprise elongated holes which substantially line up with each other when the sheet circumscribes the obstructing members.

9. The device of claim 1, further comprising a fastener configured to temporarily fasten one side edge in close proximity to the other side edge.

10. The device of claim 1, wherein the sheet comprises a front edge and a bottom surface, the device further comprising a plurality of anchor members positioned near the front edge and extending from the bottom surface of the sheet.

11. The device of claim 1, wherein one side of a triangular obstructing member is connectable to the surface of the sheet, one side of the triangular obstructing member comprises a tongue, and the other side of the triangular obstructing member comprises a groove configured to engage a corresponding tongue of an adjacent triangular obstructing member when the sheet is rolled such that the sheet substantially circumscribes the obstructing member.

12. A device for collecting loose material, the device comprising:
   a pliable planar sheet having a top surface, two opposing side edges, and a back edge adjacent to the two side edges, each side edge having an associated handle positioned parallel to the associated side edge;
   at least one obstructing member extending at a permanent, substantially perpendicular angle from the top surface of the sheet; and
   wherein the at least one obstructing member is configured to restrict an opening formed on one end of a container when the sheet is rolled around the at least one obstructing member such that the sheet substantially circumscribes the at least one obstructing member and the side edges substantially meet each other such that the handles are in close proximity to each other, allowing a person to maintain the side edges close to each other by grasping both of the handles with a single hand.

\* \* \* \* \*